INVENTOR.
LYLE F. MARTZ
BY William L. Krager
ATTORNEY

United States Patent Office 3,169,703
Patented Feb. 16, 1965

3,169,703
CASCADE DRAFT CONTROL
Lyle F. Martz, Verona, Pa., assignor, by mesne assignments, to Hagan Controls Corporation, a corporation of Delaware
Filed June 27, 1960, Ser. No. 38,804
18 Claims. (Cl. 236—15)

This invention relates to automatic control of a variable, particularly to the automatic control of pressure in a combustion chamber draft system or the like. My invention is applicable to boiler combustion chambers, soaking pits, open hearth furnaces, slab furnaces, and the like. It is applicable to any draft system having a pressure loss between primary and secondary points of control.

Prior to the present invention, there was no satisfactory method of stabilizing the draft control of a combustion chamber having a sizable pressure loss between the chamber and the control point. Maximum performance demands that the control vary immediately with the system in response to sudden changes in pressure. Conventional control systems are subject to serious instability when adjusted to follow pressure changes closely; consequently the control is generally made to lag behind the system somewhat in order to maintain stability. This lag is obviously undesirable.

Sudden changes in pressure in the combustion chamber are particularly significant in open hearth furnaces. Such a sudden change is periodically brought about by the reversal in flow of incoming air and outgoing exhaust. The waste gases are first passed through a regenerator chamber on one side of the furnace, comprising an arrangement of bricks in a latticed or checkered design, adapted to absorb sensible heat from the waste gases leaving the furnace. Periodically, the flow is reversed and incoming air is passed through the regenerator, or "checkers," to preheat it before it enters the open hearth furnace. The waste gases are at this time used to heat the checkerwork on the other side of the furnace. Depending on the flow of air, different burners on either side of the furnace are used. The air flow may be reversed every 5 to 15 minutes, generally about 7 minutes for an open hearth furnace of, say, 200 tons capacity. Obviously, the reversal of flow causes a momentary change of pressure in the chamber of the open hearth furnace which may throw a conventional draft control out of balance, requiring an adjustment to itself which is wasteful of heat and fuel.

Another factor which affects draft control in open hearth furnaces by causing great disturbances in pressure relationships is charging of the furnace. Charging of the furnace often results in "belching," the sudden explosion-like expansion caused by the initial reaction of the newly-charged material such as scrap with the heated contents of the furnace.

Prior to the present invention, draft control systems were virtually incapable of coping with sudden changes in pressure differential such as are occasioned by fuel and air reversal, charging, and the like, which resulted in great losses of heat due to the inrush of air.

My invention will be discussed specifically as applied to a basic open hearth furnace induced draft control and an induced draft boiler control. The system is equally applicable, however, to forced or induced draft control for any combustion chamber draft system having a pressure loss between the combustion chamber and the final controlled point of the waste gases or, in the case of the air intake, a pressure loss between the forced draft fan and the combustion chamber. Among the combustion chambers having such pressure losses in the draft system are most industrial boilers, soaking pits, open hearth furnaces, slab furnaces, and the like. Generally the loss of pressure is caused by a heat conserver of one type or another, a dust collector, or the like. Heat conservers utilize the sensible heat of the waste gases to heat either air or water but, of course, can be a part of any system requiring heat. A dust collector causes a pressure loss which is larger even than most heat conservers. Another cause of pressure loss of the type which is necessarily present in my invention is that which occurs across the burner registers of a forced air intake.

Throughout this specification, the terms "draft," "draft system," "draft control" and the like, are meant to include air intake and waste gas removal systems whether the pressure in the combustion chamber is normally more than atmospheric or subatmospheric.

FIGURE 6 shows in greater detail the control valve of the secondary control loop.

Operation of the invention will be described along with the physical description.

Figure 1:
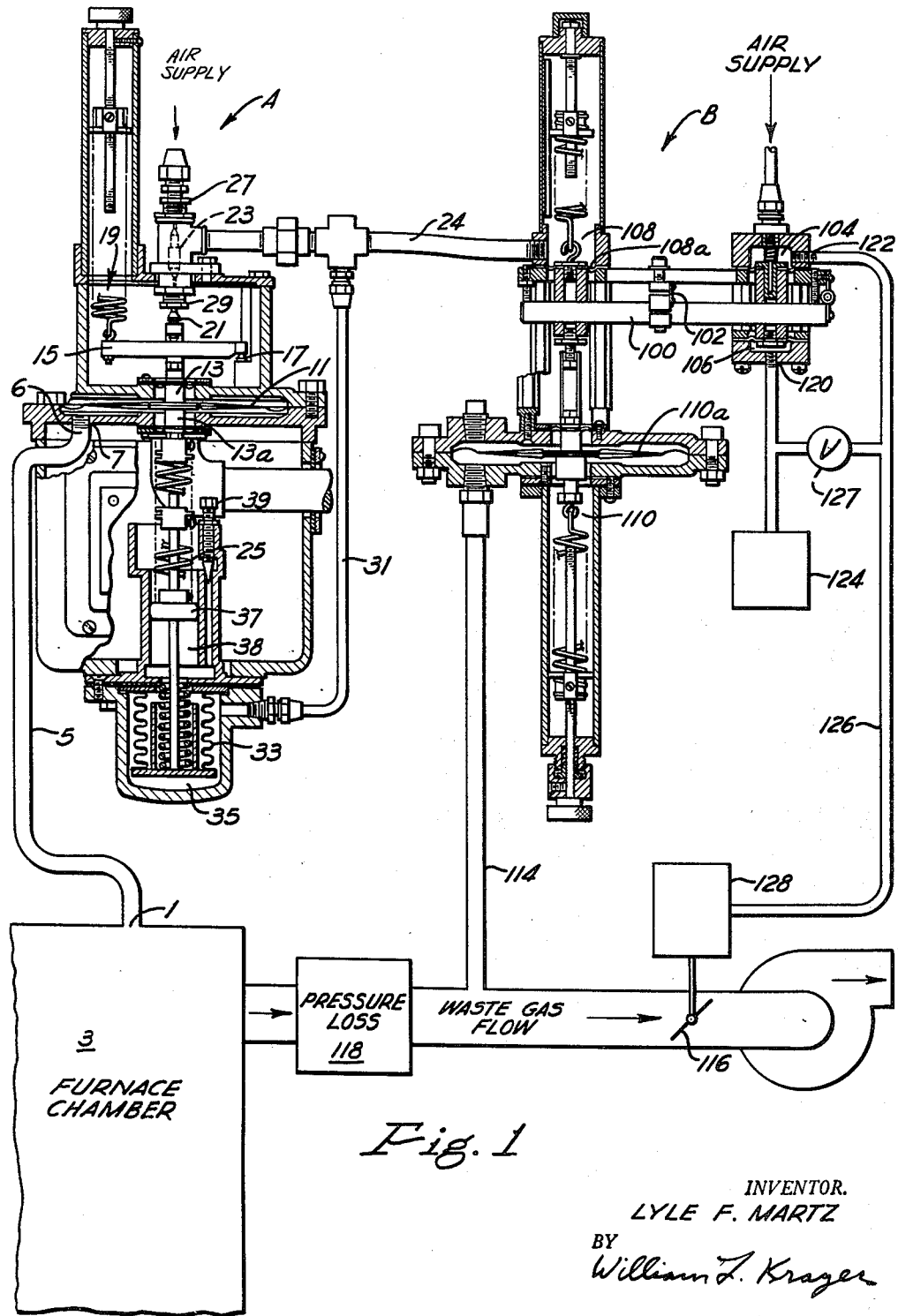
FIGURE 1 is a more or less diagrammatic view of my invention employing pneumatic controls applied to an open hearth furnace having a waste heat boiler or other cause of pressure loss located on an induced draft line.

FIGURE 1 depicts more or less diagrammatically my invention as applied to an open hearth furnace. It comprises secondary control loop A and primary control loop B. Secondary control loop A preferably includes a standard automatic mechanical feedback pneumatic control component of the slack diaphragm type. This component includes diaphragm 11, spacers 13 and 13a, beam 15 mounted on fulcrum 17, set point spring 19, valve push rod 21, valve stem 23, and stabilizing spring 25. The pressure in furnace chamber 3 is introduced through orifice 1, conduit 5, and port 6 directly into a sealed chamber defined by diaphragm 11 and plate 7 to act on the lower side of diaphragm 11.

When the forces of set point spring 19 and the pressure in the chamber below diaphragm 11 are equal, the furnace chamber pressure is at the desired value. An unbalance in these forces brings about a movement in diaphragm 11. When the furnace chamber pressure is reduced, for example, diaphragm 11 moves downward. As the diaphragm moves downward, valve push rod 21 and valve stem 23 also move downward, opening air supply inlet seat 27, closing exhaust seat 29 and increasing the output signal pressure. This output signal, varying from 0–30 p.s.i., is transmitted through line 31 to dashpot bellows chamber 35 and also transmitted through line 24 to primary loop B. Bellows 33 are compressed, forcing dashpot piston 37 upwards by pressure exerted through oil in chamber 38. Stabilizing spring 25, actuated by dashpot piston 37, exerts an upward force on diaphragm 11. Reset needle valve 39 is manually adjusted to permit dashpot piston 37 to return to its neutral position and relieve the upward force at the same rate that the controlled variable returns to the set point.

Thus, it will be obvious to those familiar with the control art that secondary control loop A is a proportional plus reset action circuit which delivers an output signal in response to an unbalance between the differential and the set point. The preferred pneumatic component, Type "D" Diaphragm Regulator of Hagan Chemicals & Controls, Inc., described in detail in the manufacturer's bulletin MYP–626, is highly sensitive. This is a slightly modified embodiment of the device disclosed in U.S. Patent 2,149,-390 to Donaldson. As will be seen, suitable electronic components may be substituted for all pneumatic components. A less efficient system may be constructed using a proportional component without reset action, which may be satisfactory for some applications.

Again referring to FIGURE 1, primary control loop B utilizes a modified ratio totalizer with proportional band or proportional plus reset circuitry. It comprises a beam 100 mounted on fulcrum 102 and having diaphragm chambers 104, 106, 108, and 110. Diaphragm 110a in chamber 110 has an area in the preferred embodiment of about 33 times the area of opposing diaphragm 108a. Chamber 108 receives the output signal from secondary loop A through conduit 24. Chamber 110 receives a pressure from line 114, said pressure being the pressure in the exhaust duct between damper 116 and the waste heat boiler 118 or other obstruction causing a pressure drop in the exhaust line. Chamber line 104 has an inlet port, marked "air supply," through which a constant pneumatic pressure is introduced. This may be atmospheric or a controlled pressure. Chamber 104 has an outlet port 122 to which is connected a feedback circuit comprising volume tank 124 and needle valve 127 connected with chamber 106. Line 126 conveys the control signal thus produced to power cylinder 128 which operates damper 116.

The preferred form of pneumatic component for the primary control loop is the "D–33" Head Ratio Totalizer of Hagan Chemicals & Controls, Inc. described in Drawing No. 456,001 of the company. However, any control component capable of receiving a pressure signal and generating a control signal biased by the secondary loop output will be satisfactory.

The primary control loop B can be either proportional or proportional plus reset. As will be obvious to those familiar with the control art, the function of the primary control loop is to bias the duct pressure by the secondary loop output and generate a signal which is a function of the differential. The output signal thus generated is used to position the damper according to the demands of both control loops.

Figure 2:
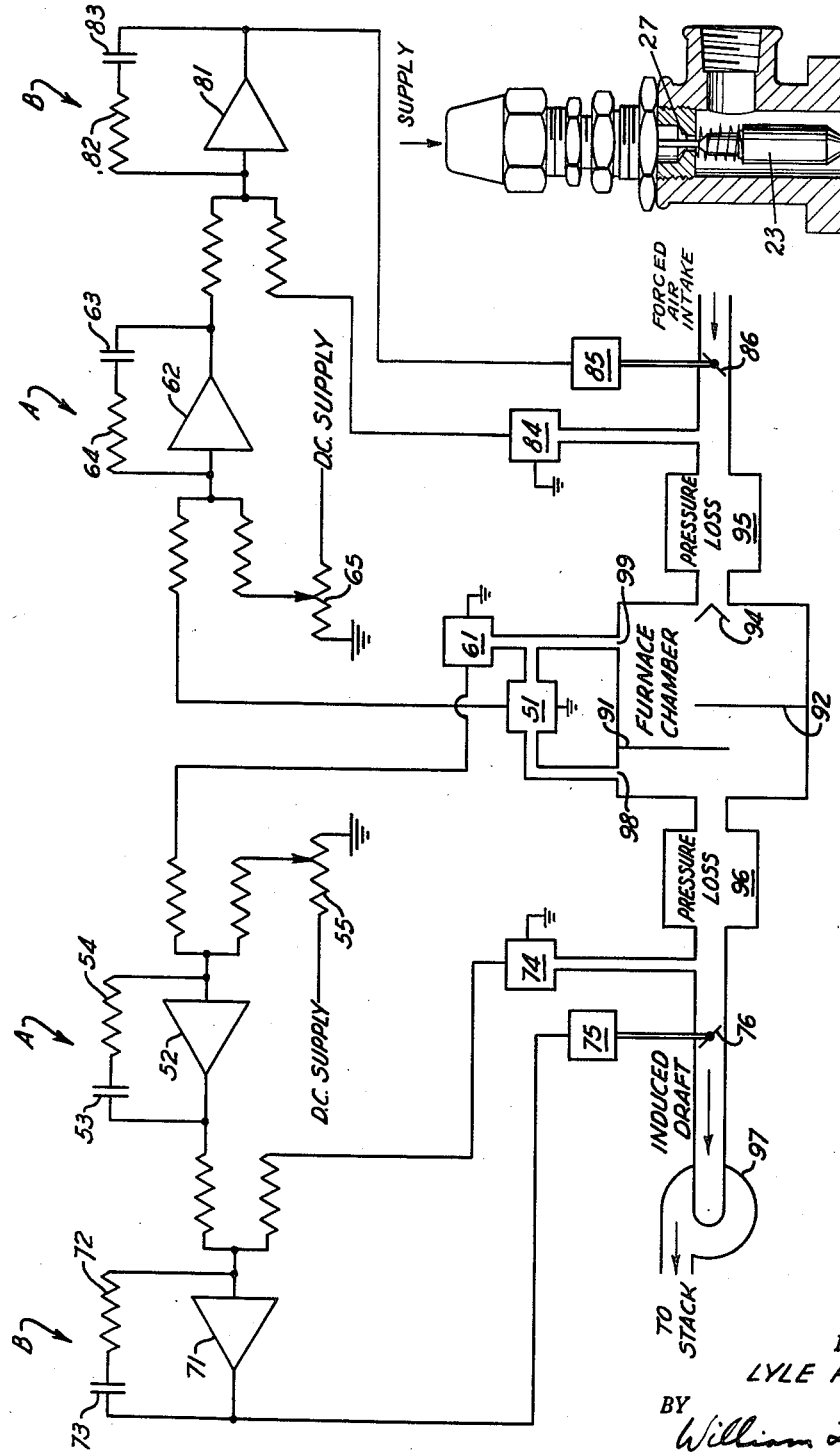
FIGURE 2 is a diagrammatic and schematic representation of my invention utilizing electronic control components applied to both air intake and exhaust in a large utility boiler combustion chamber.

It will be obvious to those familiar with the control art that FIGURE 1 depicts only the waste gas system. It is an extremely important benefit of my invention that the chamber pressure is controlled with such stability that an outstandingly efficient system may be completed by utilizing my invention on the forced draft air inlet as well. FIGURE 2 is a diagrammatic representation of my invention applied to both waste gas removal and air intake for a large utility boiler.

In FIGURE 2 the draft system is illustrated on the left of the furnace chamber and the air intake is on the right. The furnace chamber contains baffles 91 and 92 and burner 94. Pressure losses 95 and 96 may be an air heater, dust collector, or other heat exchanger or the like or a combination of such units.

Secondary control loop A of the draft control will be described first. Element 61 is a pressure transducer which receives the furnace chamber pressure directly through port 99. An electrical signal is produced by transducer 61 which signal is representative of the pressure in the furnace chamber. Any standard low pressure transducer will be satisfactory here. An example is "PowrMag" Model PE Transducer of Hagan Chemicals & Controls, Inc. described in the manufacturer's bulletin MYP–714.

The electrical signal generated by transducer 61 is transmitted to amplifier 52 having a feedback circuit containing resistor 54 and capacitor 53. Also fed into amplifier 52 is a set point signal from set point device 55. Set point device 55 may be any device capable of transmitting a signal of constant value. The output of amplifier 52 is fed into amplifier 71 of primary control loop B. Also fed into amplifier 71 is a signal representative of duct pressure, the signal being generated by the transducer 74, which is connected directly to the draft duct downstream of the pressure loss. Amplifier 71 has a feedback circuit containing resistor 72 and preferably, capacitor 73. The output of amplifier 71 operates positioner 75 for damper 76. Positioner 75 is preferably a pneumatic component. Where a pneumatic component is used, it will, of course, be necessary to convert the electrical control signal into a pneumatic control signal. Any standard converter will be satisfactory.

It will be apparent to those familiar with the control art that secondary control loop A and primary control loop B perform the same functions as their pneumatic counterparts in FIG. 1. That is, secondary control loop A is a reset action circuit which generates a signal in response to a differential between the variable furnace chamber pressure and a set point, and primary control loop B is a circuit which generates a control signal which is a function of the duct pressure biased by the secondary control loop output.

FIGURE 2 also illustrates the application of my invention to the air intake of the same boiler furnace chamber. As mentioned above, my invention provides greatly improved stability of pressure in the furnace chamber. This fact enables me to control the difference in furnace chamber pressures between points 98 and 99. To accomplish this, I employ differential transducer 51, a device capable of generating a signal which is a function of the pressure differential. The preferred component is "PowrMag" Model PE Low Pressure Differential Transducer described in Bulletin MYP–714 of Hagan Chemicals & Controls, Inc. The signal generated by differential transducer 51 is transmitted to amplifier 62, where it is compared with the signal emitted by set point device 65. Amplifier 62 has a feedback circuit having resistor 64 and capacitor 63. The reset action output of amplifier 62 is transmitted to amplifier 81 of primary control loop B. Amplifier 81 also receives a signal from transducer 84 which is representative of the pressure in the air intake duct at a point between pressure loss 95 and damper 86. The inputs of amplifier 81 are thus the duct pressure signal and the output of secondary control loop A. A feedback circuit having resistor 82 is optionally provided with reset action by capacitor 83. As with positioner 75, positioner 85 for damper 86 is preferably pneumatically operated, which, of course, requires that an electro-pneumatic converter first convert the electrical control signal to a pneumatic one.

The amplifiers used in my invention may be any amplifiers capable of performing the required functions. However, I prefer to use magnetic amplifiers of the "PowrMag" line of Hagan Chemicals & Controls, Inc.

It will be apparent to those skilled in the art of control that the secondary control loop A and primary control loop B of the forced air intake perform the same functions as the induced draft control of the open hearth furnace of FIGURE 1. The exception in the case of forced air intake is, in the perferred embodiment, that the signal introduced into control loop A represents a differential rather than a single pressure.

Figure 3:
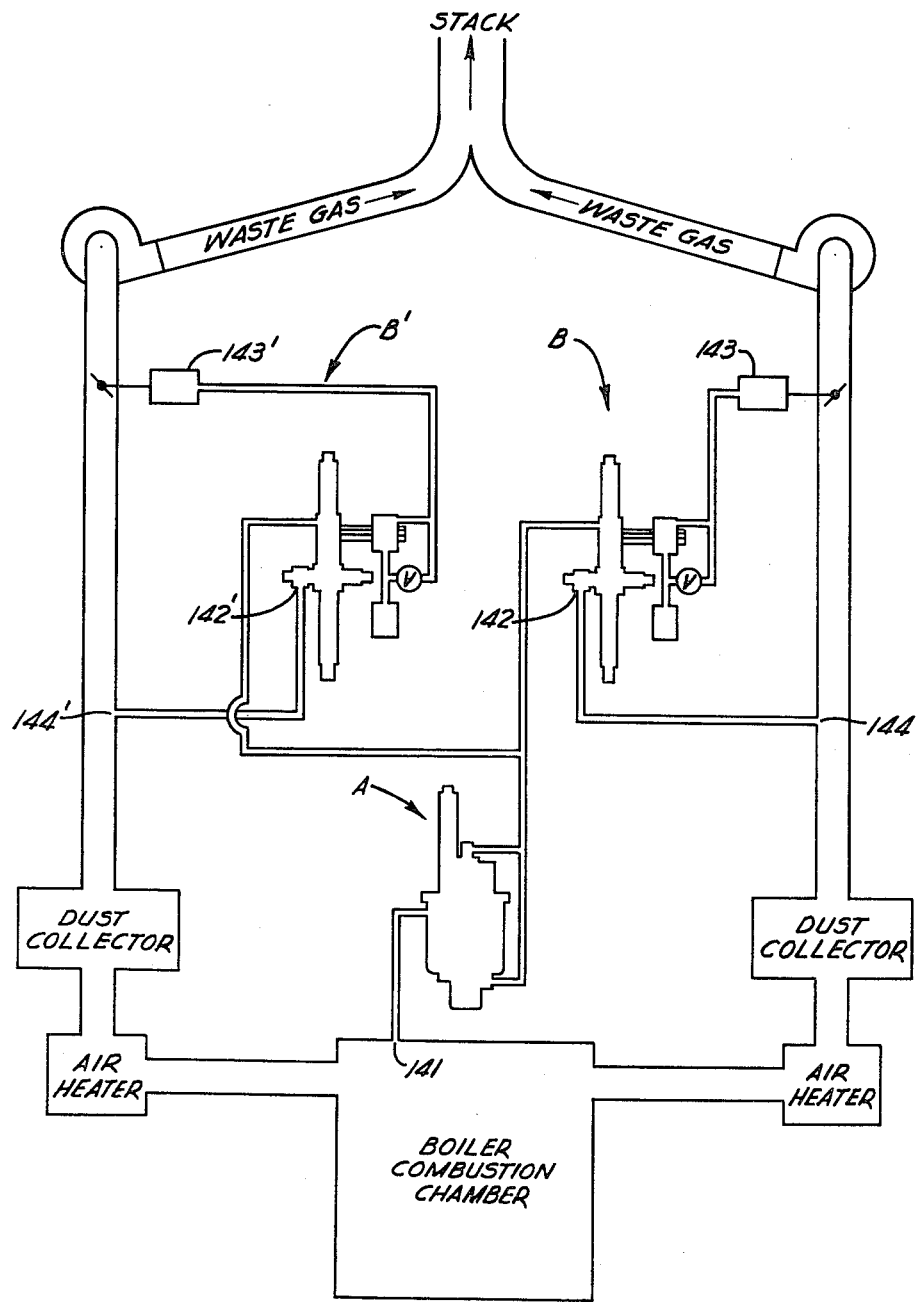
FIGURE 3 shows my invention applied to a dual induced draft boiler using pneumatic control components.

FIGURE 3 illustrates diagrammatically the application of my invention to a dual induced draft system for a large power plant boiler. My invention provides a particular advantage for dual draft systems in that the fans are balanced automatically; that is, the draft sections are balanced and, therefore, the ampere loads of the fans are always equal. In this figure, which is purely diagrammatic, there is a secondary control loop A and two primary control loops B and B'. In all other respects this variation of my invention is the same as in FIGURES 1 and 2.

In FIGURE 3 the pressure in the combustion chamber is transmitted through port 141 directly to secondary control loop A, which performs the function previously described in connection with FIGURE 1. The output of secondary loop A is transmitted to primary loops B and B' and biased against pressures directly from the duct, from points 144 and 144' introduced as in FIGURE 1 at points 142 and 142'. Primary control loops B and B' perform as in FIGURE 1 to provide the final control signals for positioners 143 and 143'. It will be obvious to those familiar with the control art that FIGURE 3 shows only the waste gas removal system and that air intake is not illustrated. In this particular boiler installation, there are dual exhaust ducts. An important result of my invention is the continuous balancing of the pressure in each duct. That is, the pressures in the ducts upstream of the dampers are always equal, which results in equal power requirements for the fans. Thus, the fans do not unnecessarily work against one another. Throughout the specification the final positioners for the dampers are preferably of the power cylinder type. Specifically, I prefer the 5 x 10 Power Positioner of Hagan Chemicals & Controls, Inc. described in detail in the manufacturer's bulletin MYP-520A. The control signal may be used to control means other than dampers for varying the pressure in the ducts. For example, the control signal may vary the speed of the fans. Other means will no doubt occur to those familiar with the control art.

Figure 4A:
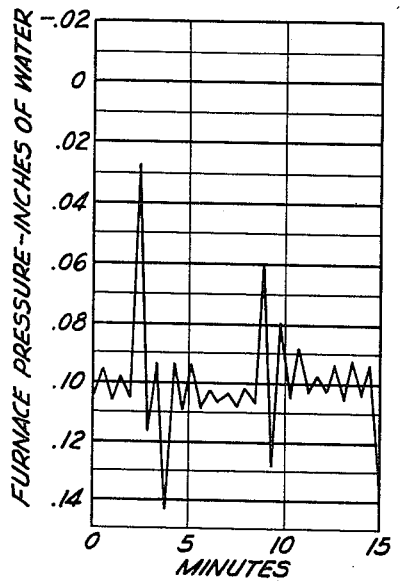
FIGURES 4a and 5a are graphs of results showing operation of an open hearth furnace without my invention.
Figure 4B:
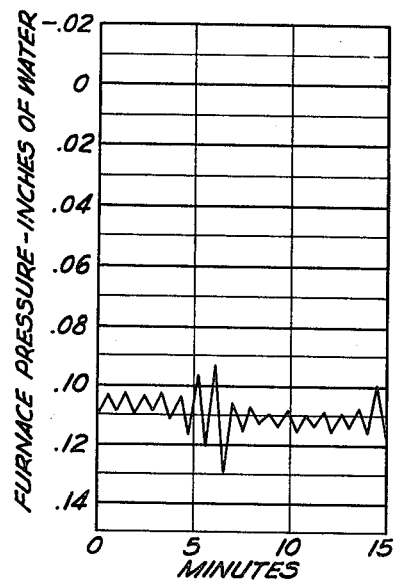
FIGURES 4b and 5b are graphs of results showing operation of an open hearth furnace with my invention.

FIGURES 4a and 4b illustrate graphically an important advantage of my invention. The graphs of FIGURES 4a and 4b were taken from a recording made from a modern large capacity open hearth furnace. They illustrate the effect on pressure inside the furnace of fuel and air reversals. FIGURE 4a utilizes conventional control; FIGURE 4b utilizes my invention for draft control. The improvement in stability is obvious.

Figure 5A:
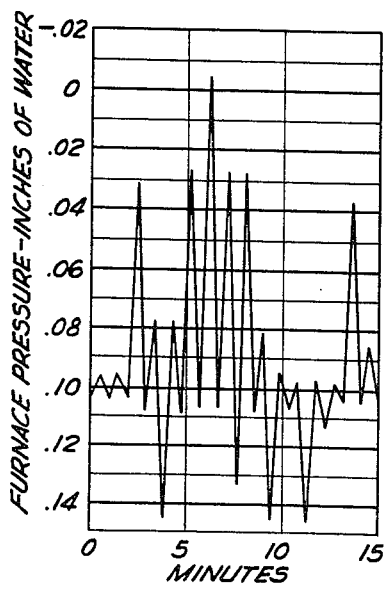
Figure 5B:
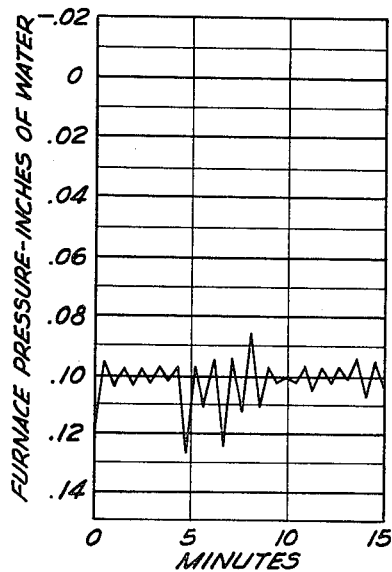

FIGURES 5a and 5b were made from recordings taken from the same open hearth furnace used for the FIGURE 4 test. FIGURE 5a shows the effect of charging the furnace with scrap while using conventional draft control, and FIGURE 5b shows the effect of charging scrap where the draft is controlled by my invention. Again the striking improvement is obvious.

FIGURE 6 shows in enlarged and greater detail the valve stem 23 and the inlet seat 27 and exhaust seat 29.

An analysis of my invention will show that it utilizes to its advantage the pressure loss generally present in the large combustion chamber draft systems for which it is designed. It will be apparent to those skilled in the art that the control gain in my invention is less when it is applied to a system having a relatively higher pressure drop between the combustion chamber and the control point. Whereas previously the combustion process had to be engineered to balance a moderately efficient control on the one hand against a moderately efficient conservation of sensible heat of waste gases, my invention permits construction of a process control providing maximum conservation of energy while also providing excellent control of the combustion process.

While I have shown and described certain presently preferred embodiments of my invention and illustrated certain presently preferred methods of practicing the same, it is to be distinctly understood that it is not restricted thereto but may be otherwise variously embodied and practiced within the scope of the following claims.

I claim:
1. Apparatus for maintaining a desired pressure in a combustion chamber having an exhaust draft duct including an obstruction which causes a pressure drop therein comprising: a first pressure transducer for generating an electrical signal representing combustion chamber pressure, a first amplifier for generating a bias signal representing a variance between said pressure signal and a set point, said amplifier having a feedback circuit comprising a resistor and a capacitor, a second pressure transducer for generating an electrical signal representing pressure at a point downstream from the pressure drop, a second amplifier for generating a control signal as a function of the duct pressure biased by a set point regulated by said bias signal, and means responsive to said control signal for positioning an air flow device at a point downstream from that at which the duct pressure is sensed by said second pressure transducer.

2. Apparatus of claim 1 in which the second amplifier is provided with proportional plus reset action means.

3. Apparatus for precision control of pressure in a combustion chamber having a forced air intake duct including an obstruction therein, comprising:
   (a) means adapted to receive a combustion chamber pressure signal for generating a bias signal representing a variance from a desired combustion chamber pressure;
   (b) means for receiving said bias signal and generating a control signal as a function of an error between a set point regulated by said bias signal and a duct pressure upstream from said obstruction; and
   (c) means responsive to said control signal for regulating pressure in the draft duct upstream from said obstruction, whereby, when the combustion chamber pressure varies from its desired value, the draft duct pressure regulating means operates to restore the desired value in the combustion chamber.

4. Apparatus for precision control of pressure in a combustion chamber having a draft system including a duct having an obstruction therein comprising:
   (a) means adapted to receive a combustion chamber pressure signal for generating a proportional plus reset action bias signal representing a variance from a desired combustion chamber pressure;
   (b) means adapted to receive a duct pressure signal representative of a duct pressure at a point (A) more distant from said combustion chamber than said obstruction, for generating a control signal which is a function of said duct pressure, said means having set point means adapted to be regulated by said bias signal; and
   (c) control signal responsive means for regulating flow in the duct, said flow regulating means being more distant from said combustion chamber than point (A), whereby, when the combustion chamber pressure varies from its desired value, the flow regulating means operates to restore the desired value in the combustion chamber.

5. Apparatus of claim 4 in which the control signal generating means are provided with proportional plus reset action means.

6. Apparatus for precision control of pressure in a combustion chamber including an exhaust draft duct having a substantial pressure drop therein comprising: a diaphragm regulator adapted to receive a combustion chamber pressure, compare it to a set point, and generate a proportional plus reset action bias signal representing an error therein; ratio totalizer means adapted to receive said bias signal and a signal representing a draft duct pressure at a point downstream from the pressure drop, adjust a set point with said bias signal, and generate a control signal representing an error between said set point and said draft duct pressure signal; and means responsive to said control signal adapted to regulate flow in the draft duct; whereby, when the combustion chamber varies from its desired value, the draft duct flow regulating means operates to restore the desired pressure value in the combustion chamber.

7. Apparatus of claim 6 in which the control signal generating means are provided with reset action means.

8. Apparatus for maintaining a desired pressure in a combustion chamber having an induced exhaust draft duct including an obstruction which causes a pressure drop therein comprising:
   (a) means responsive to combustion chamber pressure for generating a proportional plus reset action bias signal representative of a variance of the combustion chamber pressure from a desired value;

(b) means adapted to receive said bias signal for generating a control signal as a function of an error between said bias signal and a duct pressure at a point (A) downstream from said obstruction; and (c) means responsive to said control signal for regulating pressure in the draft duct downstream from point (A) whereby when the combustion chamber pressure varies from its desired value, the draft duct pressure regulating means operates to restore the combustion chamber pressure to the desired value.

9. Apparatus of claim 8 in which the control signal generating means are provided with proportional plus reset action means.

10. Apparatus for maintaining a desired pressure in a combination chamber having an induced exhaust draft duct including an obstruction which causes a pressure drop therein comprising:

(a) means responsive to combustion chamber pressure for generating a proportional plus reset action bias signal representative of a variance of the combustion chamber pressure from a desired value;

(b) means for sensing a pressure in the draft duct at a point (A) downstream from said obstruction and transmitting a signal (A) representative thereof;

(c) means adapted to receive said bias signal and said signal (A) for generating a control as a function of an error between said signals, and (d) means responsive to said control signal for regulating pressure in the draft duct, said means being operatively located downstream from point (A) whereby, when the combustion chamber pressure varies from its desired value, the draft duct pressure regulating means operates to restore the combustion chamber pressure to the desired value.

11. Apparatus of claim 10 in which the control signal generating means are provided with proportional plus reset action means.

12. Apparatus for maintaining a desired pressure in a combustion chamber having a draft duct including an obstruction therein comprising:

(a) means adapted to receive a combustion chamber pressure for generating a proportional plus reset action bias signal representative of a variance of the combustion chamber pressure from a desired value;

(b) means for sensing a pressure in the draft duct at a point (A) more distant from said combustion chamber than said obstruction and transmitting a signal (A) representative thereof;

(c) means adapted to receive said bias signal and said signal (A) for generating a control signal as a function of an error between said signals; and (d) final element means adapted to receive said control signal forregulating pressure at point (A), whereby, when the combustion chamber pressure varies from its desired value, operation of the final element means results in restoring the combustion chamber pressure to the desired value.

13. Apparatus for maintaining a desired pressure in a combustion chamber having a forced intake duct including an obstruction which causes a pressure drop therein comprising:

(a) means responsive to combustion chamber pressure for generating a proportional plus reset action bias signal representative of a variance of the combustion chamber pressure from a desired value;

(b) means adapted to receive said bias signal for generating a control signal as a function of an error between said bias signal and a duct pressure upstream from said obstruction; and (c) means responsive to said control signal for regulating pressure in the duct upstream from said obstruction, whereby, when the combustion chamber pressure varies from its desired value, the duct pressure regulating means operates to restore the combustion chamber pressure to the desired value.

14. Apparatus of claim 12 in which the control signal generating means are provided with proportional plus reset action means.

15. Apparatus for maintaining a desired pressure in a combustion chamber having a draft duct including an obstruction which causes a pressure drop therein comprising:

(a) a first pressure transducer for generating an electrical pressure signal representing combustion chamber pressure;

(b) a first amplifier adapted to receive said pressure signal for generating a bias signal representing a variance between said pressure signal and a predetermined value therefor, said amplifier including proportional plus reset action means;

(c) a second pressure transducer for generating an electrical duct pressure signal representative of a duct pressure at a point (A) more distant in the draft route from said combustion chamber than said obstruction;

(d) a second amplifier adapted to receive said duct pressure signal and said bias signal for generating a control signal as a function of said duct pressure biased by said bias signal; and (e) control signal responsive means for regulating flow in the draft duct from a point more distant in the draft route from the combustion chamber than point (A), whereby when the combustion chamber pressure varies from its desired value, the flow regulating means operates to restore the desired value in the combustion chamber.

16. Apparatus for maintaining a desired pressure in a combustion chamber having an intake duct including an obstruction which causes a pressure drop therein comprising:

(a) a first pressure transducer for generating an electrical pressure signal representing combustion chamber pressure;

(b) a first amplifier adapted to receive said pressure signal for generating a bias signal representing a variance between said pressure signal and a predetermined value therefor, said amplifier including proportional plus reset action means;

(c) a second pressure transducer for generating an electrical duct pressure signal representative of a duct pressure at a point (P) upstream from said pressure drop;

(d) a second amplifier adapted to receive said duct pressure signal and said bias signal for generating a control signal as a function of said duct pressure biased by said bias signal; and (e) control signal responsive means for regulating flow in the draft duct at a point upstream from point (P), whereby, when the combustion chamber varies from its desired value, the control signal responsive means operates to restore the desired value in the combustion chamber.

17. Apparatus of claim 16 in which the second amplifier is provided with proportional plus reset action means.

18. Apparatus for maintaining a desired pressure in a combustion chamber having a draft system including dual exhaust draft ducts each including an obstruction therein, comprising:

(a) means responsive to combustion chamber pressure for generating a proportional plus reset action bias signal representative of a variance of the combustion chamber pressure from a desired value;

(b) means associated with each draft duct adapted to receive said bias signal for generating a control signal as a function of an error between said bias signal and a duct pressure downstream from the obstruction in its respective draft duct; and (c) means associated with each draft duct responsive to the control signal generated by its respective control signal generating means, for regulating pressure downstream from the obstruction in its respective draft duct, whereby, when the combustion chamber varies from its desired value, the draft duct pressure regulating means operates to restore the combustion chamber pressure to the desired value.

References Cited in the file of this patent

UNITED STATES PATENTS

| | | |
|---|---|---|
| 1,455,633 | Lundgaard | May 15, 1923 |
| 1,611,251 | Smoot | Dec. 21, 1926 |
| 1,630,977 | Smoot | May 31, 1927 |
| 1,943,613 | Lewis | Jan. 16, 1934 |
| 2,064,864 | Temple | Dec. 22, 1936 |
| 2,328,498 | Saathoff | Aug. 31, 1943 |
| 2,349,329 | Anderson | May 23, 1944 |
| 2,416,980 | Burns | Mar. 4, 1947 |
| 2,623,698 | Dickey | Dec. 30, 1952 |
| 2,688,717 | Davis | Sept. 7, 1954 |

FOREIGN PATENTS

| | | |
|---|---|---|
| 230,061 | Great Britain | Jan. 21, 1926 |
| 540,447 | Belgium | Aug. 31, 1955 |
| 631,386 | Germany | June 19, 1936 |